UNITED STATES PATENT OFFICE.

EDWARD P. EMERSON, OF BLAIRSVILLE, PENNSYLVANIA.

COMPOSITION FOR PAINT.

Specification forming part of Letters Patent No. 27,280, dated February 28, 1860.

*To all whom it may concern:*

Be it known that I, EDWARD P. EMERSON, of Blairsville, in the county of Indiana, in the State of Pennsylvania, have invented a new and Improved Mode of Making a Paint; and I do hereby declare that the following is a full and exact mode and manner of making the same.

Provide two kettles of brass, iron, or copper, which I will denominate "No. 1" and "No. 2." Into kettle No. 1 put thirty-eight gallons of water. Take sufficient of this to blend fine fourteen pounds and a half of wheat-flour. When perfectly mixed, to be poured into kettle No. 1, that has the water in it. Then add, previously well powdered, one hundred and fifty-two pounds of whiting and seventy-five pounds of pure white hydrate of alumina. Then to be carefully brought to a boil, kept constantly stirred to prevent it from burning or sticking to the bottom of the kettle. Into kettle No. 2 put rosin, twenty-nine pounds, and add one gallon of boiled flaxseed-oil. When that melts and begins to boil, then add twenty-eight gallons of boiled oil. Let it simmer; then pour it into kettle No. 1. It is then to be slowly simmered and thoroughly mixed until it forms one homogeneous mass. From this it is to be transferred into a mixing-tub, when it is to be agitated thoroughly and well mixed. Then to be added four hundred and sixty pounds of pure white silex, free of lumps. Add to every hundred pounds of the entire mass sixteen and a half ounces of the silicate of soda and eight ounces and a half of the sulphate of alumina. It may be lixiviated in the usual way of lixiviating or grinding other paints and colored with any pigment not incompatible with any of the ingredients. Flaxseed-oil may be used to assist in the lixiviating or grinding, or to give it a proper consistency necessary for use. It is to be applied, in the manner that all other paints are, to zinc, copper, lead, or tin, also to felt, pasteboard, canvas, glass, wood, brick, or stone.

What I claim as my invention, and desire to secure by Letters Patent, is—

The composition of ingredients and mode of manufacturing the fire and water proof paint substantially as described.

EDWARD P. EMERSON.

Witnesses:
CHARLLS W. NICKERSON,
JAMES K. PETERS.